(12) United States Patent
Wilmot et al.

(10) Patent No.: US 7,039,585 B2
(45) Date of Patent: May 2, 2006

(54) METHOD AND SYSTEM FOR SEARCHING RECORDED SPEECH AND RETRIEVING RELEVANT SEGMENTS

(75) Inventors: Gerald Johann Wilmot, Marina, CA (US); Robert Kern, Stuttgart (DE)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 09/962,659

(22) Filed: Sep. 24, 2001

(65) Prior Publication Data

US 2002/0147592 A1    Oct. 10, 2002

Related U.S. Application Data

(60) Provisional application No. 60/283,089, filed on Apr. 10, 2001.

(51) Int. Cl.
*G10L 15/26* (2006.01)
(52) U.S. Cl. .................... 704/235; 379/88.14
(58) Field of Classification Search ............... 704/235; 379/88.14
See application file for complete search history.

(56) References Cited

U.S. PATENT DOCUMENTS

| | | | |
|---|---|---|---|
| 4,623,761 A | 11/1986 | Winter et al. | |
| 4,829,576 A | 5/1989 | Porter | |
| 5,436,653 A | 7/1995 | Ellis et al. | |
| 5,606,643 A | 2/1997 | Balasubramanian et al. | |
| 5,655,058 A | 8/1997 | Balasubramanian et al. | |
| 5,664,060 A | 9/1997 | Jarrett et al. | |
| 5,664,227 A * | 9/1997 | Mauldin et al. ............ | 715/516 |
| 5,710,591 A | 1/1998 | Bruno et al. | |
| 5,835,667 A * | 11/1998 | Wactlar et al. ................ | 386/96 |
| 5,862,519 A | 1/1999 | Sharma et al. | |
| 5,875,427 A | 2/1999 | Yamazaki | |
| 6,064,963 A | 5/2000 | Gainsboro | |
| 6,084,582 A | 7/2000 | Qureshi et al. | |
| 6,100,882 A | 8/2000 | Sharman et al. | |

(Continued)

FOREIGN PATENT DOCUMENTS

EP    0649144 A1    4/1995

(Continued)

OTHER PUBLICATIONS

Martin Franz, Scott McCarley *Indexing with Translation Model for Feature Regularization* U.S. Appl. No. 09/493,507 filed Jan. 28, 2000 (IBM Docket No. YOR919990699US1).

(Continued)

*Primary Examiner*—Daniel Abebe
(74) *Attorney, Agent, or Firm*—Sawyer Law Group LLP

(57) ABSTRACT

A system and method for searching recorded speech is disclosed. The system and method comprises converting the recorded speech into text using a voice recognition system. As the speech is being converted, naturally occurring breaks in the languages will be used to take time indexes from the recording. The system and method includes creating a full text index of the recorded speech utilizing an information extender. The full text index contains a plurality of time stamps that point to the occurrence of words in the recorded speech. Finally, the text is searched by a full text search server that has linguistic search capabilities using the full text index. Finally, the searched text, the text index and the recorded speech are stored in the database. The recorded speech is searched by locating relevant phrases or words, and then mapping the time stamps associated with the relevant phrases words back to the recorded speech in the database.

39 Claims, 9 Drawing Sheets

U.S. PATENT DOCUMENTS

| | | | |
|---|---|---|---|
| 6,185,527 B1 | 2/2001 | Petkovic et al. | |
| 6,260,011 B1 * | 7/2001 | Heckerman et al. | 704/235 |
| 6,507,643 B1 * | 1/2003 | Groner | 379/88.14 |
| 6,697,796 B1 * | 2/2004 | Kermani | 707/3 |

FOREIGN PATENT DOCUMENTS

| | | |
|---|---|---|
| JP | PUPA03-274950 | 12/1991 |
| JP | PUPA06-004598 | 1/1994 |
| JP | PUPA10-507554 | 7/1998 |
| JP | PUPA11-025112 | 1/1999 |
| JP | PUPA2000-348064 | 12/2000 |
| JP | PUPA2001-256335 | 9/2001 |
| WO | WO9950764 | 10/1999 |

OTHER PUBLICATIONS

"Speech and language Technologies for Audio Indexing and Retrieval," Proceedings of the IEEE, vol. 88, No. 8, Aug. 2000, pp. 1338-1353.

"Improved Correction of Stenographers' Errors through Audio Playback," Gennaro, et al., IBM Technical Disclosure Bulletin, vol. 36, No. 06A, Jun. 1993.

"Multiple-search of video segments indexed by time-aligned annotations of video content," IBM Research Disclosure, Mar. 2000, pp. 603-608.

* cited by examiner

METHOD AND SYSTEM FOR SEARCHING RECORDED SPEECH AND RETRIEVING RELEVANT SEGMENTS

CROSS-REFERENCE TO RELATED APPLICATION

This application is claiming, under 35 USC 119(e), the benefit of provisional application Ser. No. 60/283,089 filed on Apr. 10, 2001.

FIELD OF THE INVENTION

The present invention relates generally to recording of speech and more particularly to recording and retrieving relevant segments of the recorded speech.

BACKGROUND OF THE INVENTION

Speech can be recorded for a variety of purposes and by many different techniques. Recorded speech can be utilized as a way of storing information. Oftentimes it may then be desirable to retrieve portions of that recorded speech for reference purposes. Recorded speech is valuable as stored and retrieved information for a number of reasons. First, in most cases, speech is the most natural way to communicate. Second, transcribing speech to text is expensive. Third, listening to recorded speech is possible even while a person is busy with something else (i.e., while driving). Fourth, compared to text, speech contains additional information about the speaker's mood and feeling. Fifth, storing recorded speech is inexpensive since it consumes only a small amount of storage capacity.

However, when using recorded speech, it can be difficult to locate specific contents of the speech in a large amount of recorded speech. For this reason, up to the present time saving hours of recorded speech as an information reference source has been ineffective and inefficient, because finding the relevant information in the recorded speech has required listening to hours' worth of recording in order to locate the desired segment of speech which contains the relevant information. Therefore, up to the present time recorded speech has rarely been utilized as a reference source.

For example, the media network CNN, which provides a 24 hours news broadcast, produces 24 hours of recorded speech information every day. The majority of this information is informative and would constitute an excellent reference source for student and researcher. Currently the raw information is not searchable, making it impossible to use the audio track as a reference source. Accordingly, what is needed is a system and method that overcomes the above-identified problem. The present invention addresses such a need.

SUMMARY OF THE INVENTION

A system and method for searching recorded speech is disclosed. The system and method comprises converting the recorded speech into text using a voice recognition system. As the speech is being converted, naturally occurring breaks in the languages will be used to take time indexes from the recording. The system and method includes creating a full text index of the recorded speech utilizing an information extender. The full text index contains a plurality of time stamps that point to the occurrence of words in the recorded speech. Finally, the text is searched by a fill text search server that has linguistic search capabilities using the full text index. Finally, the searched text, the text index and the recorded speech are stored in the database. The recorded speech is searched by locating relevant phrases or words, and then mapping the time stamps associated with the relevant phrases/words back to the recorded speech in the database.

DETAILED DESCRIPTION

The present invention relates generally to recording of speech and more particularly to recording and retrieving relevant segments of the recorded speech. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
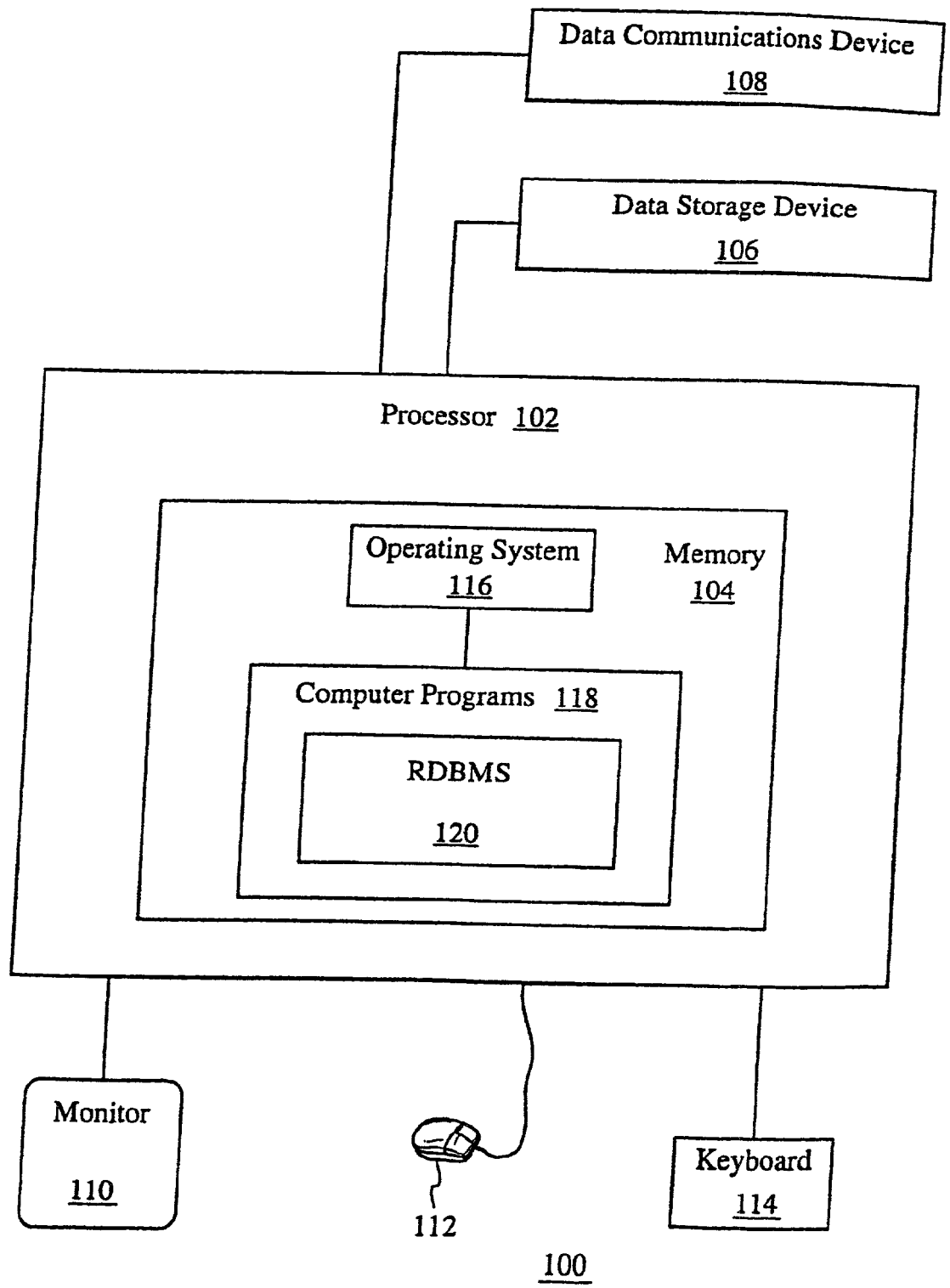
FIG. 1 illustrates a hardware environment used to implement the present invention.

FIG. 1 illustrates a hardware environment used to implement the present invention. As illustrated in FIG. 1, in the preferred embodiment the present invention is implemented in a server computer ("server") 100. The server 100 could be part of the treatment unit 200 (FIG. 1) or could be a separate unit. The server 100 generally includes a processor 102, a memory 104 such as a random access memory (RAM), a data storage device 106 (e.g., hard drive, floppy disk drive, CD-ROM disk drive, etc.), a data communication device 108 (e.g., modem, network interface device, etc.), a monitor 110 (e.g., CRT, LCD display, etc.), a pointing device 112 (e.g., a mouse, a track ball, a pad or any other device responsive to touch, etc.) and a keyboard 114. It is envisioned that attached to the computer 100 may be other devices such as read only memory (ROM), a video card drive, printers, peripheral devices including local and wide area network interface devices, etc. One of ordinary skill in the art will recognize that any combination of the above system components may be used to configure the server 100.

The server 100 operates under the control of an operating system ("OS") 116, such as MVS™, AIX™, UNIX™, OS/2™, WINDOWS™, WINDOWS NT™, etc., which typically is loaded into the memory 104 during the server 100 start-up (boot-up) sequence after power-on or reset. In operation, the OS 116 controls the execution by the server 100 of computer programs 118, including server and/or client-server programs. Alternatively, a system and method in accordance with the present invention may be implemented with any one or all of the computer programs 118 embedded in the OS 116 itself without departing from the scope of the invention. In a preferred embodiment, however, the client programs are separate from the server programs and are not resident on the server.

The OS 116 and the computer programs 118 each comprise computer readable instructions which, in general, are tangibly embodied in or are readable from a media such as the memory 104, the data storage device 106 and/or the data communications device 108. When executed by the server 100, the instructions cause the server 100 to perform the steps necessary to implement the present invention. Thus, the present invention may be implemented as a method, apparatus, or an article of manufacture (a computer-readable media or device) using programming and/or engineering techniques to produce software, hardware, firmware, or any combination thereof.

The server 100 is typically used as a part of an information search and retrieval system capable of receiving, retrieving and/or dissemination information over the Internet, or any other network environment. One of ordinary skill in the art will recognize that this system may include a plurality of servers 100.

In an information search and retrieval system such as a digital library system, a client program communicates with the server 100 by, inter alia, issuing to the server search requests and queries. The server 100 then responds by providing the requested information. The digital library system is typically implemented using a database management system software (DBMS) 120 such as the DB2™ by IBM Corporation. The DBMS 120 receives and responds to search and retrieval requests and termed queries from the client. In the preferred embodiment, the DBMS 120 is server-resident.

Figure 2:
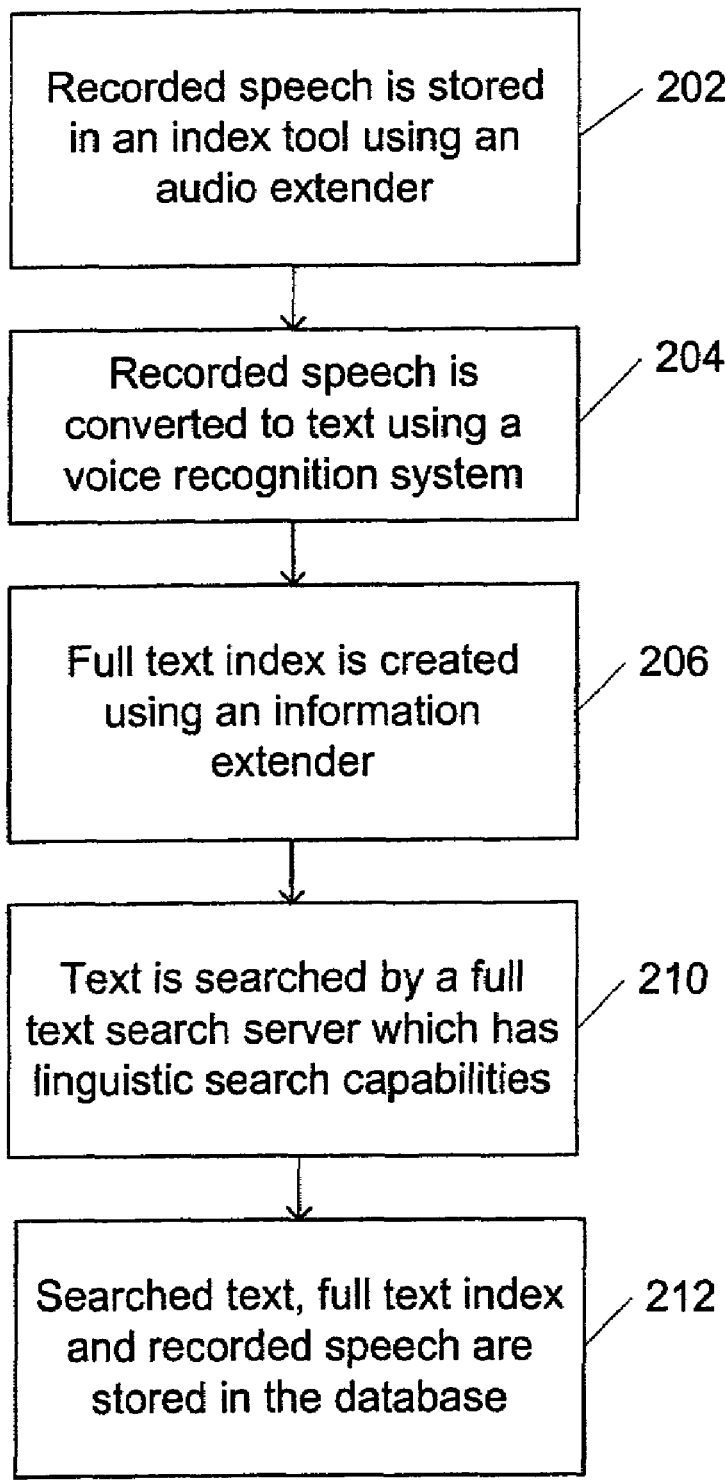
FIG. 2 is a flowchart that illustrates the process of searching recorded speech.

FIG. 2 is a flowchart that illustrates the process of searching recorded speech via a database. A system and method in accordance with the present invention allows for recorded speech to be searched in the following manner. First, recorded speech is stored in, for example, an index tool using, for example, a DB2 audio extender, via step 202. Next, the recorded speech is converted to text using a voice recognition system such as Via Voice, via step 204. During this conversion, naturally occurring breaks in the converted speech will be used to provide a plurality of time stamps. Next, a full text index of the recorded speech is created, using an information extender such as DB2 Text Information System, via step 206. Finally the text is searched by a full text search server that has linguistic search capabilities such as a DB2 text extender in order to provide a text index, via step 210. The text index contains time stamps that point to the occurrences of the words in the recorded speech. Thus, specific contents can be played back without listening to the complete recording. Thereafter, the searched text, the full text index and the recorded speech are stored in the database, via step 212.

Prior to the present invention, it was difficult to find specific information in a large amount of recorded speech. It is known that due to audio interferences or failures of the speech recognition tool not all words are transformed properly. However, there are still enough representative words in the text index that point back to the recorded speech to allow the above-identified process to be utilized to provide speech.

Figure 3:
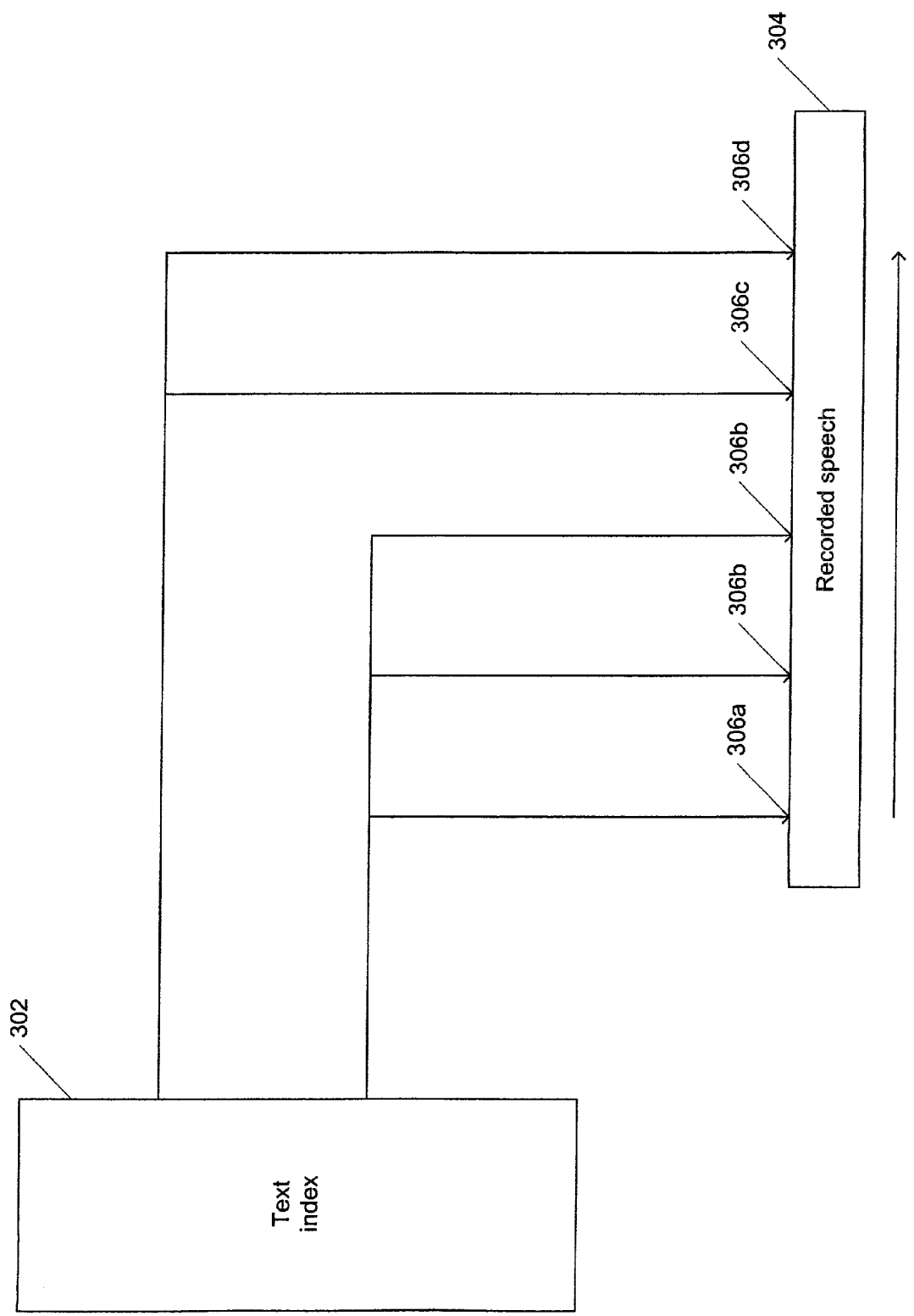
FIG. 3 illustrates an example of the playback process in accordance with the present invention.

FIG. 3 illustrates an example of the playback process in accordance with the present invention. The playback process utilizes a text index 302 that points to the recorded speech 304 at particular points in time by time stamps 306*a*–306*d*.

Possible scenarios for this process include (a) searching voicemails stored in a voicemail system; (b) searching recorded sessions to make the contents available afterwards (i.e., phone conversations); (c) searching recorded sessions which have been stored to proof the contents later; (d) searching recorded lectures to get details which are not available on foils or which the audience did not receive when the lecture was presented; and (e) searching recorded broadcast programs or the audio tracks of television programs in order to find specific information.

FIGS. 4–9 illustrate various scenarios for utilizing a system and method in accordance with the present invention. They will be described in detail hereinbelow.

Figure 4:
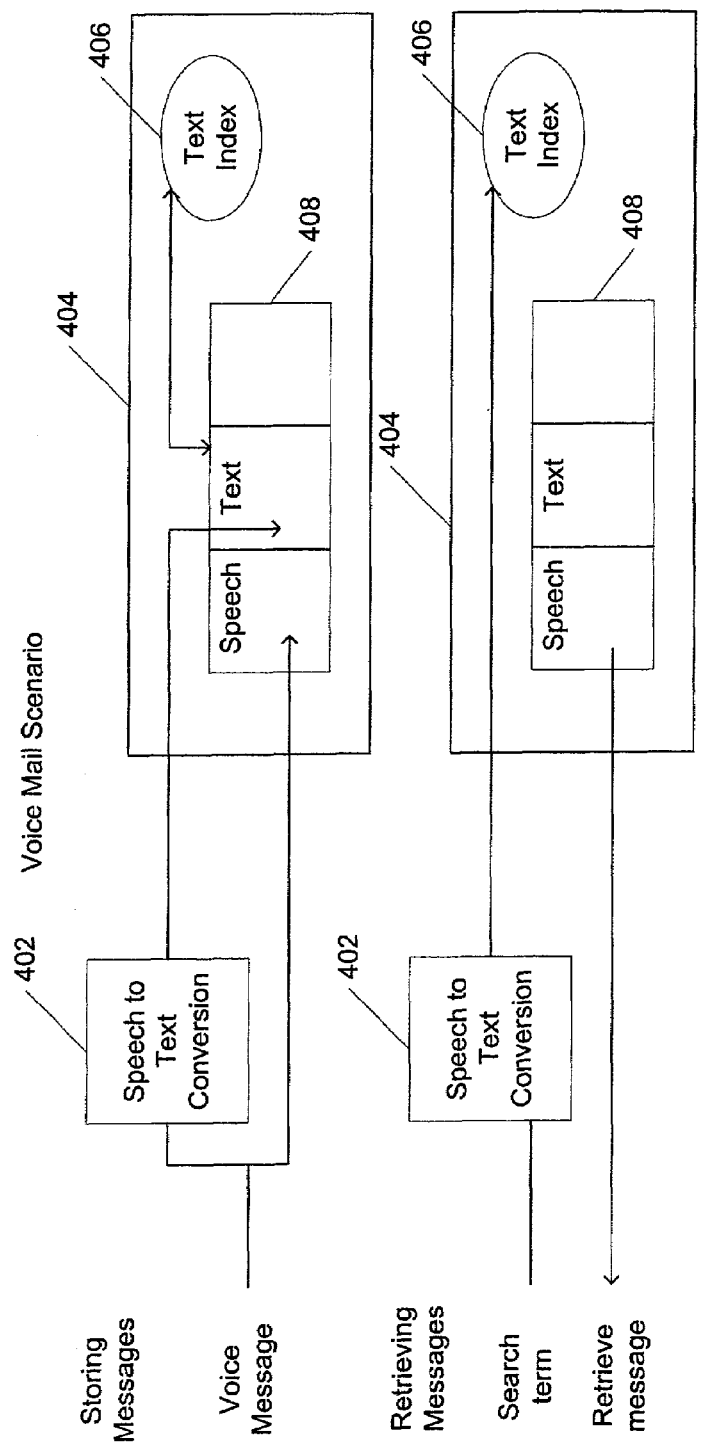
FIG. 4 illustrates a first voicemail scenario that could be utilized in a system in accordance with the present invention.

FIG. 4 illustrates a voicemail scenario that could be utilized in a system in accordance with the present invention. In the voicemail scenario, storing messages and retrieving messages is illustrated. When storing messages, a converter 402, such as Via Voice, converts the speech to text. The text is provided to storage 408 of an audio extender and text information extender 404. The voice message is also directly stored as speech. As before mentioned, the text is indexed by text index 406 to allow for retrieval. A search term is provided to the text index 406 that then allows for the retrieval of the message from the speech portion of the storage 408. The first voicemail scenario illustrates (a) accessing voicemails by calling the voicemail system; (b) saying the keywords that a person is looking for; and (c) listening to the phrases that contain the keywords.

The benefits of the first voicemail scenario are that it is no longer necessary to listen to complete voice messages repeatedly to get specific contents; it is easy to retrieve specific information from voice messages (i.e., phone numbers) even if there are hundreds of voice messages; and large numbers of voice messages can be searched.

Figure 5:
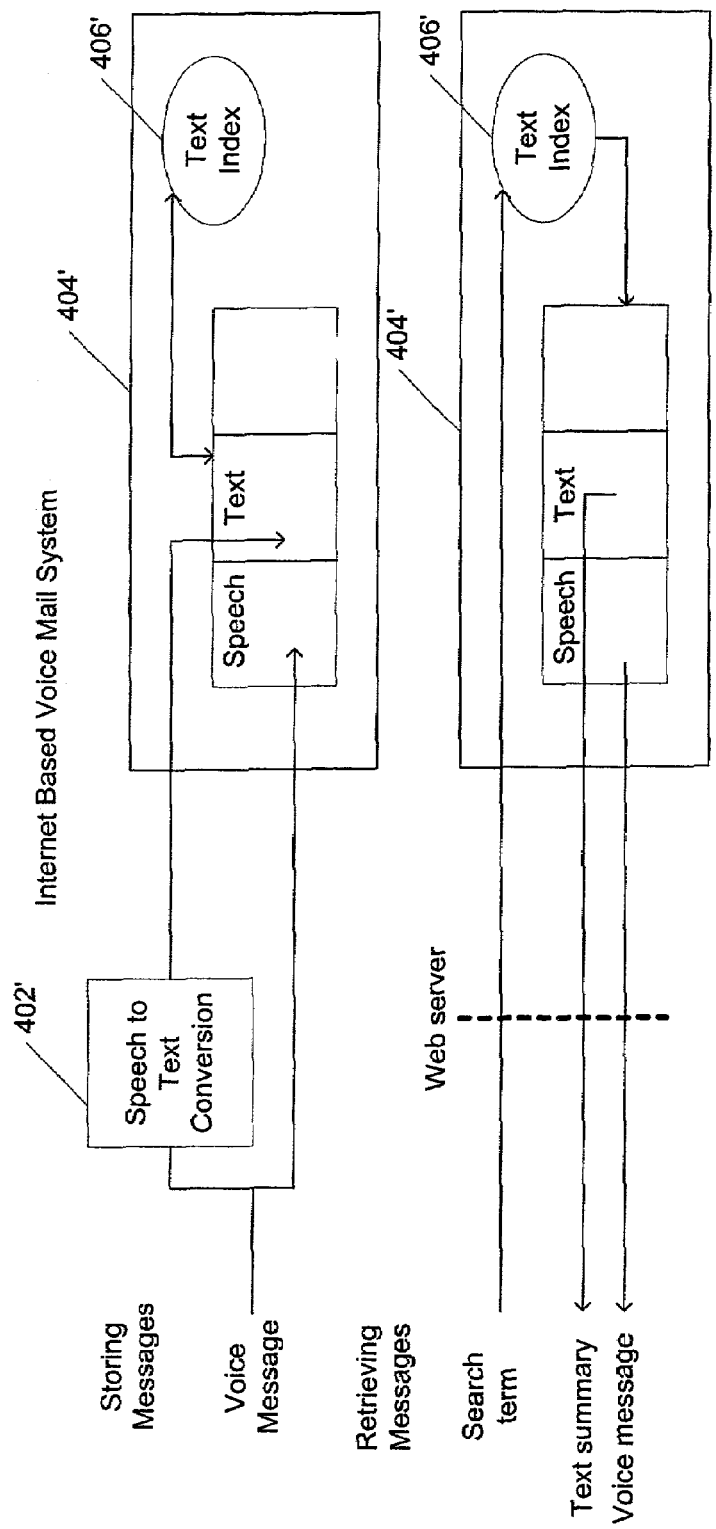
FIG. 5 illustrates an Internet-based voicemail system that could be utilized in a system in accordance with the present invention.

FIG. 5 illustrates an Internet-based voicemail system that could be utilized with a system in accordance with the present invention. What is illustrated here is a voice message being stored and retrieved in an Internet-based voicemail system. In storing messages the actions are similar to that described with respect to FIG. 4. In addition, when retrieving messages, a search term is provided, the text index 406' then causes a text summary to be provided to the user via the web server as well as a voice message is provided via the web server. This figure illustrates (a) accessing a voicemail server via the Internet; (b) entering the search words or phrases as text; (c) observing a text summary of the search results, and (d) listening to the contents a person is interested in.

The benefits of an Internet-based voicemail system include: (a) voicemails can be selected by observing a textual summary of their contents; (b) voicemails can be categorized in folders; (c) the user can decide to download only relevant voicemails; and (d) very large numbers of voice messages can be maintained.

Figure 6:
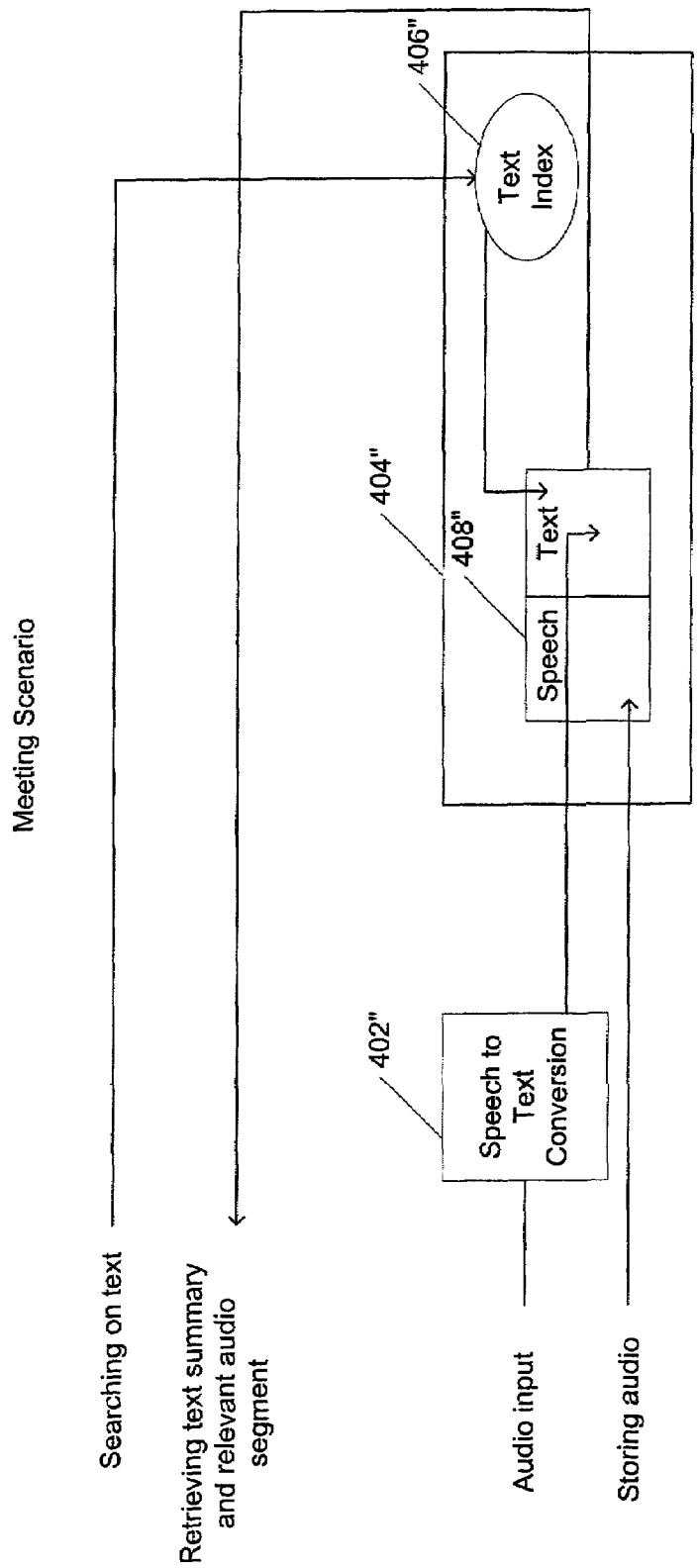
FIG. 6 illustrates a meeting scenario that could be utilized in a system in accordance with the present invention.

FIG. 6 illustrates a meeting scenario that could be utilized with a system in accordance with the present invention. In the meeting scenario, audio is input into the speech to text converter 402" which provides the text. The text index indexes the text as before described and the text summary and the relevant audio segments can be retrieved from the text of the storage 408". The meeting scenario provides for (a) listening to the relevant portions of a recorded meeting or phone conferences by accessing a session server using a computer; (b) obtaining the words or phrases that are being looked for; (c) observing a textual summary of what was found; and (d) listening to the contents that a person is interested in. The benefits of the first meeting scenario are that relevant contents can be selected by seeing a textual summary; contents can be easily categorized; and it is possible to retrieve important details which were not noticed during the original session.

A second meeting scenario is described below. The second meeting scenario provides for (a) listening to the relevant parts of a recorded meeting or phone conference by calling the session server using a phone or a cell phone; (b) saying the words or phrases that are being looked for; and (c) listening to the contents that a person is interested in. The benefits of the second meeting scenario are that contents can be easily categorized; and it is possible to get important details that were not noticed during the original session.

Figure 7:
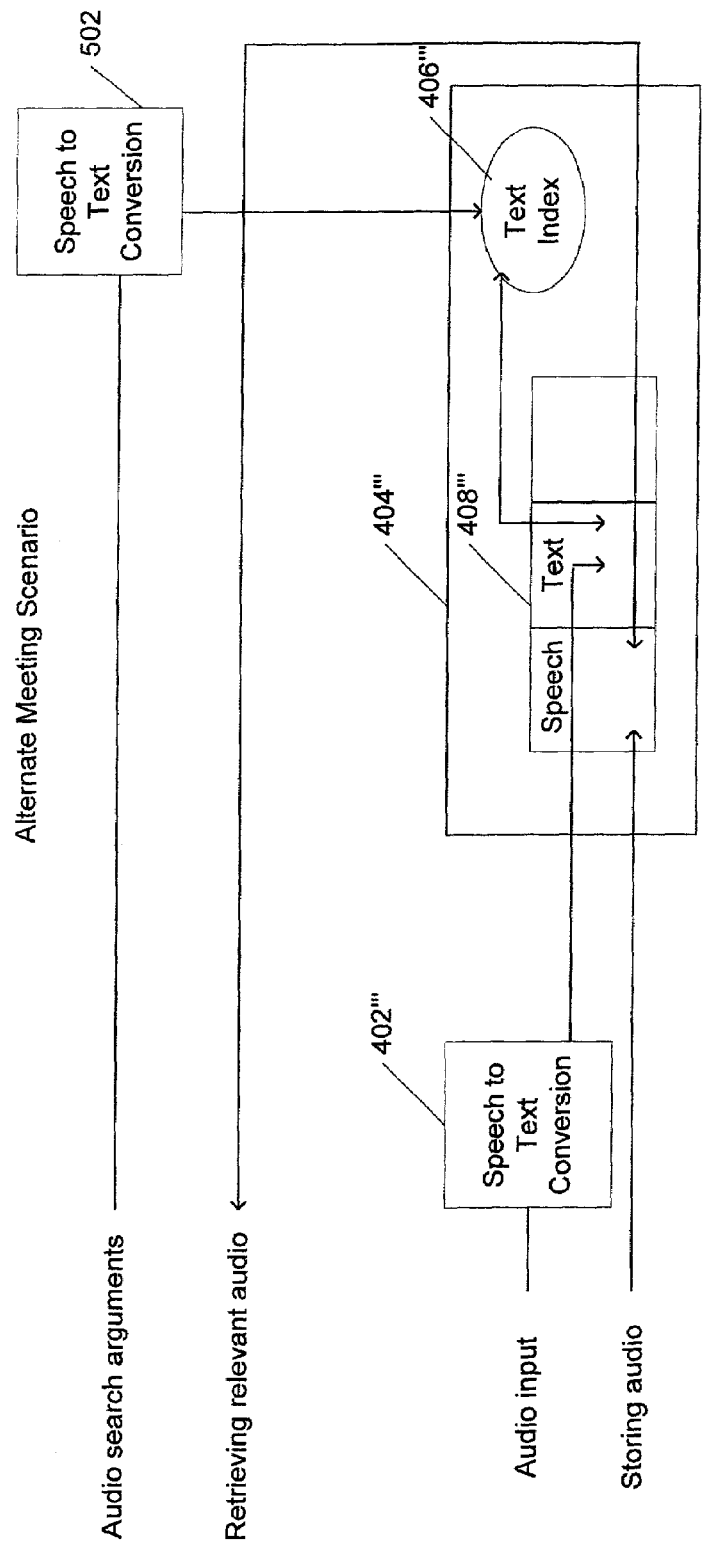
FIG. 7 illustrates an alternative meeting scenario.

FIG. 7 illustrates an alternate meeting scenario in which there are two speech to text converters 402''' and 502. Converter 402''' is utilized in the manner described in the previous Figures. Converter 502 is utilized to convert the audio search arguments to text. The text is then provided to the text index. This scenario illustrates (a) audio search arguments and (b) retrieving relevant audio.

Figure 8:
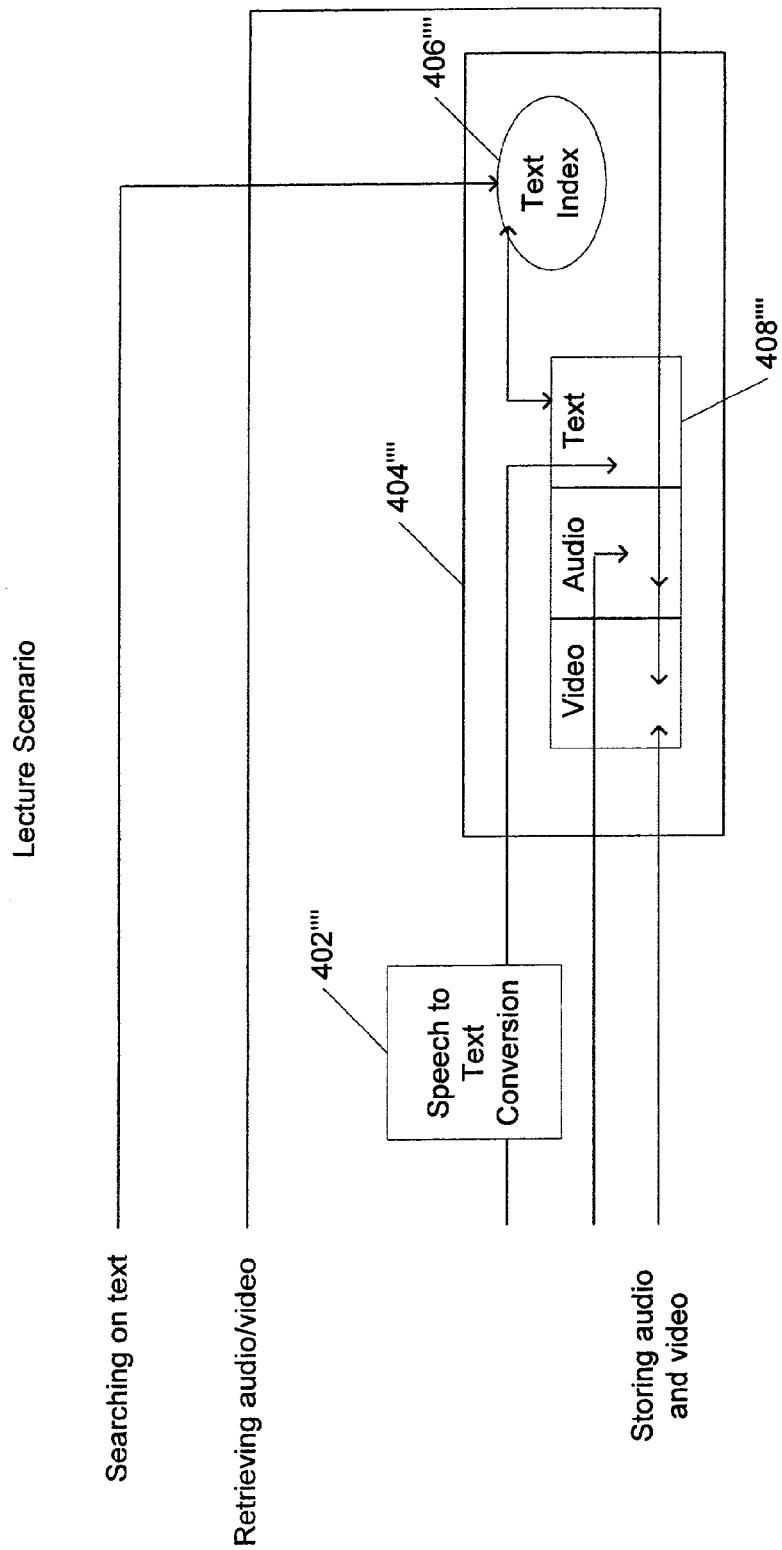
FIG. 8 illustrates a lecture scenario.

FIG. 8 illustrates a lecture scenario wherein the audio and video are stored in storage 408, as well as the use of the text index 406 to retrieve appropriate audio and video. This scenario illustrates (a) searching on text; (b) retrieving audio or video; and (c) storing audio and video.

Figure 9:
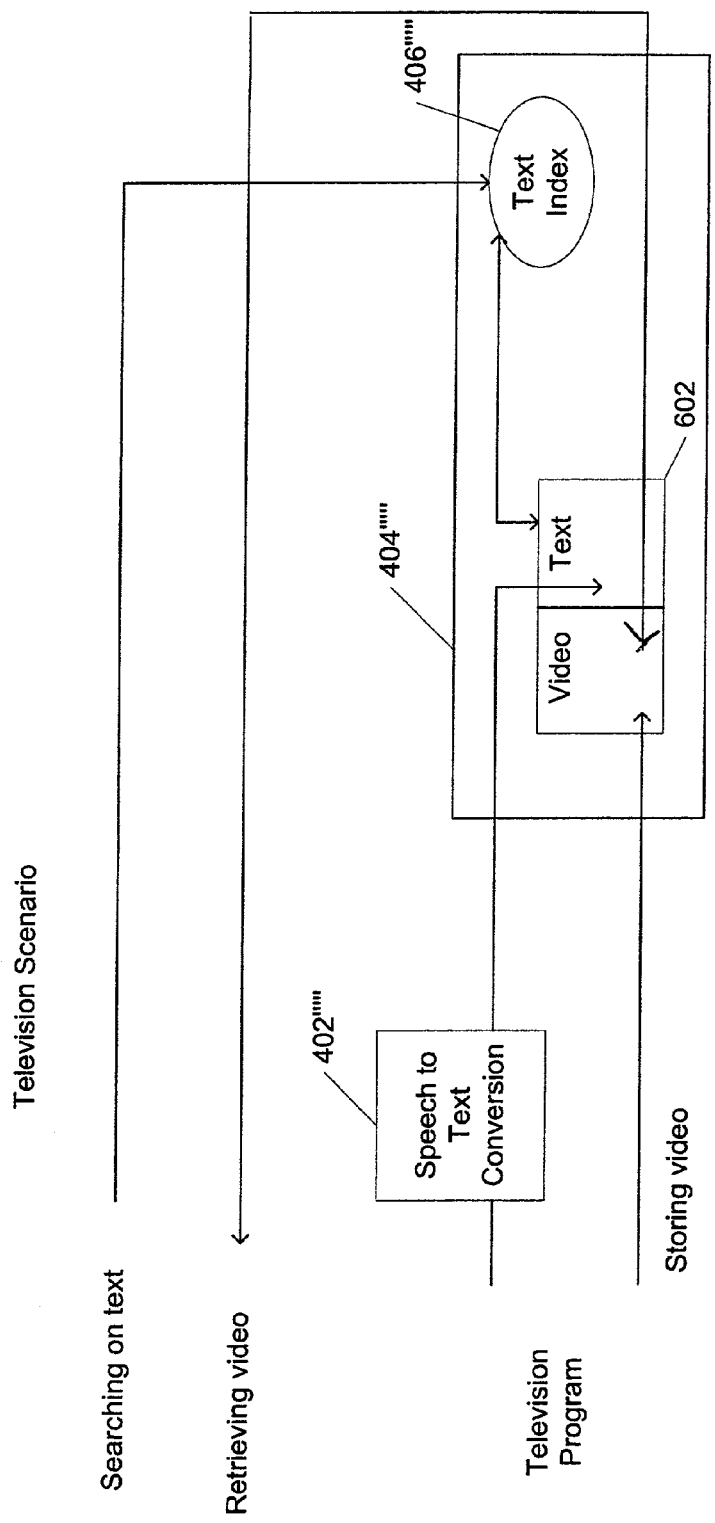
FIG. 9 illustrates a television scenario.

FIG. 9 illustrates a television scenario. This scenario illustrates (a) searching on text, (b) retrieving video, and (c) storing video.

Accordingly, as is shown, a system and method in accordance with the present invention can be utilized in a variety of environments including but not limited to lectures, radio, videoconferencing and television scenarios to provide for improved searching of recorded speech.

The following is an example of a news customer scenario in accordance with the present invention, using CNN as an example. CNN provides a 24-hour news broadcast and produces 24 hours of recorded video/speech information every day. The majority of the information is informative and would be an excellent reference source for students and researchers. Currently the raw information is not searchable, making it impossible to be utilized as a reference source. With the DB2 Speech Extender the recorded audio track, which is for the most part speech describing and providing detailed information on the video, could be indexed and made available for searching. Once these audio tracks of the broadcasts are searchable they could be used as a reference source for information and as a reference source for finding video of particular events or actions, since the audio index can be used as an index back to the video.

A system and method in accordance with the present invention indexes recorded speech and allows the user to search the recorded speech in a way similar to that utilized by users who search for documents on the internet. The results of the search yield the relevant segments of the recorded speech. Utilizing the method and system in accordance with the present invention, recorded speech can be saved and the information contained in the recorded speech can more easily and efficiently be researched and utilized.

A method and system in accordance with the present invention allows users to search the saved recorded speech by entering either a text search string or a spoken search phrase. The method and system would then search the recorded speech index and return the message segments that match the search criteria. These segments could then either be played back or the text transcription of the recorded speech could be viewed, to see if these speech segments meet the user's requirements. The user would then pick the desired segment rather than playing back the entire recording or voice message.

In a method and system in accordance with the present invention, the recorded audio track, which for the most part contains speech which describes and provides detailed information about what is on the corresponding video track, could be indexed and made available for searching. Once broadcasts are searchable then they become a reference source for information, and a resource for finding video particular events or actions, since the audio index can be used as an index back to the video.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for searching recorded speech in a database, the method comprising:
    (a) converting the recorded speech to text utilizing a voice recognition system, wherein breaks in the recorded speech are used to provide a plurality of time stamps;
    (b) creating a full text index of the recorded speech utilizing an information extender, the full text index containing the plurality of time stamps which point to the occurrence of words in the recorded speech;
    (c) searching the text by a full text server utilizing the full text index; and
    (d) storing the searched text, the full text index and the recorded speech in the database, wherein specific contents of the recorded speech can be played back utilizing the full text index without listening to the complete recording.

2. The method of claim 1 wherein the converting step (a) includes the step of (a1), storing the recorded speech in an index tool utilizing an audio extender.

3. The method of claim 1 wherein the plurality of time stamps are produced during step (a).

4. The method of claim 1 wherein the recorded speech is voicemail messages provided by an Internet-based voicemail system.

5. The method of claim 4 wherein the voicemail messages are played back by accessing the voicemails, saying the keywords and listening to the phrases that contain the key words.

6. The method of claim 1 wherein the recorded speech is voicemail messages provided by an Internet-based voicemail system.

7. The method of claim 6 wherein a voicemail server is accessed via the Internet, search words and/or phrases of the voicemail message, observing a summary of the search results and listening to the relevant portions of the messages.

8. The method of claim 1 wherein the recorded speech comprises a recorded meeting.

9. The method of claim 8 wherein a recorded meeting is played back by listening to relevant portions of the recorded meeting, typing words and/or phrases that are being looked for, observing a textual summary of what was found and listening to the relevant contents based upon the textual summary.

10. The method of claim 8 wherein the recorded meeting is played back by listening to relevant portions of the speech, saying the words and/or phrases that are being looked for and listening to the relevant contents.

11. The method of claim 1 wherein the recorded speech includes video.

12. The method of claim 11 wherein the video is searched based upon the full text index.

13. The method of claim 1 wherein the recorded speech comprises a news program.

14. A system for searching recorded speech in a database, the system comprising:
   means for converting the recorded speech to text utilizing a voice recognition system, wherein breaks in the recorded speech are used to provide a plurality of time stamps;
   means for creating a full text index of the recorded speech utilizing an information extender, the full text index containing the plurality of time stamps which point to the occurrence of words in the recorded speech;
   means for searching the text by a full text server utilizing the full text index; and
   means for storing the searched text, the full text index and the recorded speech in the database, wherein specific contents of the recorded speech can be played back utilizing the full text index without listening to the complete recording.

15. The system of claim 14 wherein the converting means includes the means for storing the recorded speech in an index tool utilizing an audio extender.

16. The system of claim 14 wherein the plurality of time stamps are produced by the converting means within.

17. The system of claim 14 wherein the recorded speech is voicemail messages provided by an Internet-based voicemail system.

18. The system of claim 17 wherein the voicemail messages are played back by accessing the voicemails, saying the keywords and listening to the phrases that contain the key words.

19. The system of claim 14 wherein the recorded speech is voicemail messages provided by an Internet-based voicemail system.

20. The system of claim 19 wherein a voicemail server is accessed via the Internet, search words and/or phrases of the voicemail message, observing a summary of the search results and listening to the relevant portions of the messages.

21. The system of claim 14 wherein the recorded speech comprises a recorded meeting.

22. The system of claim 21 wherein a recorded meeting is played back by listening to relevant portions of the recorded meeting, typing words and/or phrases that are being looked for, observing a textual summary of what was found and listening to the relevant contents based upon the textual summary.

23. The system of claim 21 wherein the recorded meeting is played back by listening to relevant portions of the speech, saying the words and/or phrases that are being looked for and listening to the relevant contents.

24. The computer readable medium of claim 23 wherein the recorded speech comprises a news program.

25. The system of claim 14 wherein the recorded speech includes video.

26. The system of claim 25 wherein the video is searched based upon the full text index.

27. The system of claim 14 wherein the recorded speech comprises a news program.

28. A computer readable medium containing program instructions for searching recorded speech in a database, the program instructions for:
   (a) converting the recorded speech to text utilizing a voice recognition system, wherein breaks in the recorded speech are used to provide a plurality of time stamps;
   (b) creating a full text index of the recorded speech utilizing an information extender, the full text index containing the plurality of time stamps which point to the occurrence of words in the recorded speech;
   (c) searching the text by a full text server utilizing the full text index; and
   (d) storing the searched text, the full text index and the recorded speech in the database, wherein specific contents of the recorded speech can be played back utilizing the full text index without listening to the complete recording.

29. The computer readable medium of claim 28 wherein the converting step (a) includes the step of (a1), storing the recorded speech in an index tool utilizing an audio extender.

30. The computer readable medium of claim 28 wherein the plurality of time stamps are produced during step (a).

31. The computer readable medium of claim 28 wherein the recorded speech is voicemail messages provided by an Internet-based voicemail system.

32. The computer readable medium of claim 31 wherein the voicemail messages are played back by accessing the voicemails, saying the keywords and listening to the phrases that contain the key words.

33. The computer readable medium of claim 28 wherein the recorded speech is voicemail messages provided by an Internet-based voicemail system.

34. The computer readable medium of claim 33 wherein a voicemail server is accessed via the Internet, search words and/or phrases of the voicemail message, observing a summary of the search results and listening to the relevant portions of the messages.

35. The computer readable medium of claim 28 wherein the recorded speech comprises a recorded meeting.

36. The computer readable medium of claim 35 wherein a recorded meeting is played back by listening to relevant portions of the recorded meeting, typing words and/or phrases that are being looked for, observing a textual summary of what was found and listening to the relevant contents based upon the textual summary.

37. The computer readable medium of claim 35 wherein the recorded meeting is played back by listening to relevant portions of the speech, saying the words and/or phrases that are being looked for and listening to the relevant contents.

38. The computer readable medium of claim 28 wherein the recorded speech includes video.

39. The computer readable medium of claim 38 wherein the video is searched based upon the full text index.

* * * * *

UNITED STATES PATENT AND TRADEMARK OFFICE
CERTIFICATE OF CORRECTION

PATENT NO. : 7,039,585 B2
APPLICATION NO. : 09/962659
DATED : May 2, 2006
INVENTOR(S) : Wilmot et al.

It is certified that error appears in the above-identified patent and that said Letters Patent is hereby corrected as shown below:

Column 1

Line 66: delete "fill" and replace with --full--.

Column 6

Line 30: before "occurrence", delete "the" and replace with --an--.

Line 36: after "to" and before "complete", delete "the" and replace with --a--.

Column 7

Line 18: before "occurrence", delete "the" and replace with --an--.

Line 24: after "to", delete "the" and replace with --a--.

Column 8

Line 14: before "occurrence", delete "the" and replace with --an--.

Line 20: after "to" and before "complete", delete "the" and replace with --a--.

Signed and Sealed this

Fourteenth Day of November, 2006

JON W. DUDAS
*Director of the United States Patent and Trademark Office*